United States Patent Office 3,106,546
Patented Oct. 8, 1963

3,106,546
BLOCK COPOLYMERS OF POLYCARBONATES FROM BISPHENOL A AND 4,4'-BIS(HYDROXYPHENYL) NAPHTHYLMETHANES, THE LATTER COMPOUNDS PER SE AND HOMOPOLYMERS THEREOF
Thomas M. Laakso and David A. Buckley, Rochester, N.Y., assignors to Eastman Kodak Company, Rochester, N.Y., a corporation of New Jersey
No Drawing. Filed July 17, 1959, Ser. No. 827,705
5 Claims. (Cl. 260—47)

This invention relates to the compounds per se and to improved polycarbonates of 4,4'-bis(hydroxyphenyl)-naphthylmethane and such polycarbonates which are essentially composed of alternating blocks having structures composed of (I) recurring units from bisphenol A and (II) recurring units from 4,4'-bis(hydroxyphenyl)-naphthylmethanes wherein from about 40 to 85 mole percent of the recurring units are derived from bisphenol A. The naphthyl radicals can also be halogenated. This invention also relates to a process for preparing the block copolymers. These polymers and block copolymers are characterized by having high heat softening temperatures, a high Young's modulus of elasticity and a high degree of flexibility. Useful photographic elements are also included in this invention wherein a film of the improved polycarbonate supports a coating of light-sensitive emulsion.

The preparation of polycarbonates of the general class with which this invention is concerned is well known in the art. A number of patents have been issued in the last few years describing polycarbonates prepared from bisphenol A and from other bisphenols. Among the prior art are various articles in the literature concerning this subject including an article by Schnell as to polycarbonates as a new group of plastics and the preparation and properties of aromatic polyesters of carbonic acid, Angewandte Chemie, 68: 633–660, No. 20, October 21, 1956.

An object of this invention is to provide an especially valuable improved block copolymeric polycarbonate predominantly derived from bisphenol A (40–85 mole percent) which has quite unusual properties which were unexpected in view of the prior art.

Another object is to provide homopolymeric polycarbonates of 4,4'-bis(hydroxyphenyl)-naphthylmethanes which are novel compounds and are in themselves a further object of this invention. These compounds include those having halogen atoms on the naphthyl radical.

A further object of this invention is to provide a process for preparing such improved polycarbonates which are characterized by a block structure.

A further object of this invention is to provide photographic elements comprising a film support prepared from the improved polycarbonates provided by this invention and coated with a light-sensitive silver halide photographic emulsion.

Other objects will become apparent elsewhere herein.

According to a preferred embodiment of this invention there is provided an improved polycarbonate of bisphenol A consisting of a highly polymeric block copolymer having an inherent viscosity of from about 0.4 to about 3.5 essentially composed of alternating blocks having the structures:

(I) Blocks composed of from about 3 to about 50 recurring units having the following Formula A:

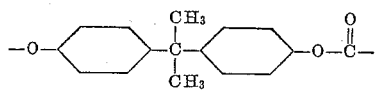

and (II) Blocks composed of about 3 to about 50 recurring units having the following Formula B:

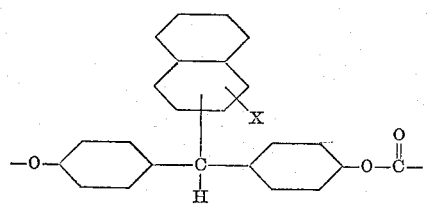

wherein the naphthyl radical is attached in a position selected from the 1 and 2 positions and X represents the substituent in the other one of the 1 and 2 positions and is selected from the group consisting of a chlorine atom, a fluorine atom and a hydrogen atom and wherein from about 15 to 65 mole percent of said block copolymer is composed of said units having Formula A, said block copolymer being characterized by having a heat distortion temperature in the range of from about 190°–225° C., having a Young's modulus of elasticity for film which is substantially as great as for the homopolymer of units of Formula B and at least about 26,000 kg./sq. cm. which is more than 10% greater than for the homopolymer of units of Formula A, and having a flexibility measured by the MIT folds test at least about 35.

Thus, this invention provides a highly useful series of high molecular weight block unit polymers having two different prepolymer blocks of units of a linear polycarbonate of a 4,4'-bis(hydroxyphenyl)naphthylmethanes (wherein the naphthyl may be halogenated) and a linear polycarbonate of 2,2-bis(4-hydroxyphenyl) propane (called bisphenol A). This series of block copolymers possesses to a surprisingly satisfactory degree the valuable properties of all of the blocks present in the polymer. This is considered an unobvious discovery for various reasons including the fact that polycarbonates of bisphenol A do not yield the results achieved in accordance with this invention. Thus, the series of block copolymers encompassed by this invention have a most unexpectedly high Young's modulus of elasticity, a satisfactory degree of flexibility as measured by the MIT folds test and high heat distortion temperatures, all of which are important characteristics of any film to be used as a support for a photographic element.

The article mentioned above written by Schnell explains that the broad concept of such polycarbonates as are contemplated by this invention was known prior to the discoveries disclosed herein. Work in various places based upon the activities of workers in this art during the past half century has recently resulted in a preparation of commercial polycarbonate films derived from bisphenol A which is more specifically known as 2,2-bis(4-hydroxyphenol)propane. It appears that such bisphenol A polycarbonates are not only being commercially used for many of the purposes for which films in general are useful but that they are also being contemplated for certain rather severely limited utility as a photographic film support. Thus, the use of polycarbonates from bisphenol A as a photographic base is very seriously limited by the fact that the Young's modulus of elasticity is only somewhere on the order of about 23,000 kg./sq. cm. This compares quite unfavorably with other commercially available film bases such as cellulose triacetate where the Young's modulus lies in the range of 30,000–40,000. Another film base useful for photographic purposes is oriented polystyrene which has a Young's modulus somewhere on the order of about 35,000 kg./sq. cm. or perhaps a little less.

It is obvious that for a photographic film base to be a significant improvement over the prior art it should have some properties which render it substantially superior to cellulose triacetate which is generally recognized as the most commonly used satisfactory film base for photographic purposes. The tremendous number of characteristics and properties of photographic film bases is well known in the art relating to photography. The work in recent years in this art has tended toward the development of new base materials such as the general class of polyesters including polycarbonates, polyvinyl derivatives such as polystyrene, etc. A polyester such as polyethylene terephthalate is useful as a film base but cannot be solvent cast by the practicable techniques so carefully and thoroughly developed during the last few decades with regard to cellulose esters as film bases. Although polyvinyl derivatives such as polystyrene can be solvent cast, a film base prepared from polystyrene (even though it has been oriented) has a heat softening temperature on the order of only about 100° C. and therefore has rather limited utility. In contrast, a film base derived from cellulose triacetate has a heat softening temperature on the order of about 155° C.

The photographic film bases which can be solvent cast and which have been described in the prior art as of commercial value such as cellulose triacetate and polystyrene are considered to have flexibilities which are merely on the edge of being satisfactorily acceptable. Thus, cellulose triacetate has a flexibility as measured by the MIT folds test of about 25–35 folds. Polystyrene is somewhat better when oriented and has an average flexibility of about 50.

With the development of polycarbonate films such as can be derived from bisphenol A it became obvious that they had promise with regard to their use as photographic film bases provided that the Young's modulus of elasticity could be improved upon. One polycarbonate mentioned by Schnell and by others which appeared to have some promise was that derived from tetrachlorobisphenol A, however this polycarbonate as a film has very low flexibility and is quite unsatisfactory for commercial applications as a photographic film base.

One possibility which was considered by the inventors was the preparation of random copolymers of bisphenol A with a view toward obtaining a copolymer which might have improved flexibility and a reasonably high heat softening temperature along with all of the other properties necessary for satisfactory utility as a photographic film support. However, it was found that most such modifications of the polycarbonate from bisphenol A resulted in reductions in the properties such as flexibility of films prepared therefrom, the heat softening temperature, etc. Further work was also performed involving mixtures of homopolymers from bisphenol A. In doing this it was found that the Young's modulus was significantly reduced in many cases although in some cases it still retained satisfactory value for marginal utility of limited use for certain photographic film purposes.

It was, therefore, quite surprising when it was found that block copolymers prepared in accordance with the invention described herein had a Young's modulus very nearly as great or greater than for the homopolymer derived from 4,4 - bis(hydroxyphenyl)naphthylmethane and at least about 26,000 kg./sq. cm. Other tests disclosed that the polycarbonates contemplated by this invention had exceptionally high heat distortion or softening temperatures of about 190–225° C. which was most unexpected and other properties and characteristics which rendered them quite useful as photographic film supports. Such other properties have been adequately described in the prior art with regard to polycarbonates of this general type.

Perhaps the most outstanding property of the polycarbonate film bases is the retention of the Young's modulus of elasticity at much higher temperatures than in the case of film from cellulose triacetate, polystyrene in oriented form and polyethylene terephthalate in oriented form. Thus, the polycarbonate films produced in accordance with the present invention retain to a substantial degree their high modulus of elasticity at temperatures up to their heat softening temperatures, namely 190°–225° C. In contrast, the retention of Young's modulus for polyethylene terephthalate begins to fall off very rapidly at temperatures of about 100° C. and becomes significantly less than the Young's modulus for the polycarbonates of this invention at temperatures approaching 200° C. This factor also applies to film supports prepared from cellulose esters and polystyrene although the drop-off is not as pronounced as it is for polyethylene terephthalate. As a result, the polyesters of this invention have unusually valuable properties as photographic film supports at temperatures above 150° C.

Thus, according to this invention it has been found that by preparing block copolymers consisting of alternating sequences of polycarbonates derived from bisphenol A (particularly polymers from up to 40% or more of bisphenol A), there is obtained a significant improvement in the substandard properties of bisphenol A polycarbonates without sacrificing to any unacceptable degree the desirable values shown by the homopolymers. These block copolymers show physical properties quite different from the random copolymers prepared by conventional methods. That these block copolymers are not physical mixtures is shown by their different solubility characteristics in organic solvents.

This invention also provides novel polycarbonates as homopolymers from 4,4' - bis(hydroxyphenyl)naphthylmethane as well as these novel compounds per se. One of the most remarkable properties of these novel compounds is that they can be used to prepare block copolymeric polycarbonates with bisphenol A such that the block copolymers retain characteristics imparted by these novel compounds despite the inherently weaker properties inherent from bisphenol A.

This invention can be further illustrated by the following examples of preferred embodiments although it will be understood that these examples are included merely for purposes of illustration and are not intended to limit the scope of the invention unless otherwise specifically indicated:

EXAMPLE A

*Homopolycarbonates—General Procedure*

One tenth gram mole of the bisphenol is dissolved in 11.2 g. (0.28 mole) sodium hydroxide in about 200 ml. of distilled water. This solution is cooled to about 10° C. and about 120 ml. of distilled methylene chloride is added. With good stirring, a solution of 10.9 g. (0.11 mole) phosgene in about 50 ml. of cold, dry, distilled methylene chloride is added within a period of about 15 minutes at such a rate that the temperature does not exceed about 12° C. After the phosgene is added, 5–10 drops of tri-n-butylamine is added. Stirring is continued to a point where the viscosity of the lower methylene chloride layer increases to the consistency of a thick dough. The reaction is made acid with glacial acetic acid. Several hundred ml. of chloroform is added to dissolve the dough and the resulting solution is washed free of all soluble materials with running cold water so that a drop of the solution gives a clear film when coated on a glass plate. The polymer is isolated by pouring the viscous dope into several volumes of methyl alcohol. Other equivalent solvents, catalysts and caustic can be similarly used in equivalent proportions and at variations in temperatures, reaction periods, etc.

The yield of polycarbonate is about 80–95% of the theoretical value and it has an inherent viscosity of 0.4 to 3.5 in chloroform depending on variations in conditions.

EXAMPLE B

*Homopolycarbonate From 4,4'-Bis(Hydroxyphenyl)- Naphthyl Methane*

Using the procedure of Example A, the following materials were employed to prepare the polymer:

4,4'-bis(hydroxyphenyl)naphthyl
 methane _____ 32.6 g. (0.1 mole).
Sodium hydroxide _____ 11.2 g. (0.28 mole).
Phosgene in 50 ml. cold, dry, distilled
 methylene chloride _____ 10.9 g. (0.11 mole).
Distilled water _____ 200 ml.
Distilled methylene chloride _____ 120 ml.
Tri-n-butylamine _____ 10 drops.

Yield=81 percent. Viscosity determined in chloroform=0.51.

The film cast from methylene chloride solution had the following physical properties:

Young's modulus _____ $2.73 \times 10^4$ kg./cm.$^2$.
Yield and tensile _____ 756 kg./cm.$^2$.
Elongation _____ 5.5 percent.
Tear _____ 120.
Folds _____ 80.
Heat distortion temperature _____ 215° C.

EXAMPLE C

*Block Copolycarbonate From Bisphenol A (60 Mole Percent) and 4,4'-Bis(Hydroxyphenyl)Naphthyl Methane (40 Mole Percent)*

The following materials were employed to prepare the prepolymers.

COMPONENT A

Bisphenol A _____ 35.4 g. (0.12 mole).
Sodium hydroxide _____ 13.4 g. (0.336 mole)
Phosgene in 50 ml. cold, dry, distilled methylene chloride _____ 13.1 g. (0.13 mole).
Distilled water _____ 340 ml.
Distilled methylene chloride _____ 160 ml.

COMPONENT B 4,4'-bis(hydroxyphenyl)naphthyl
 methane _____ 26.1 g. (0.08 mole).
Sodium hydroxide _____ 9.0 g. (0.224 mole).
Phosgene in 50 ml. dry, cold, distilled methylene chloride _____ 8.7 g. (0.089 mole).
Distilled water _____ 200 ml.
Distilled methylene chloride _____ 160 ml.

COMPONENT C

Tri-n-butylamine _____ 1 ml.

Simultaneous preparation of the two homopolymer blocks was employed (see components above) in two separate three-necked flasks equipped with a stirrer, a thermometer and a dropping-funnel were placed distilled water, sodium hydroxide and the bisphenol component. A clear solution was obtained and the flask was maintained at about 15° C. or lower by means of an ice bath, then part of the distilled methylene chloride was added with stirring and phosgene dissolved in cold, dry, distilled methylene chloride was added slowly within a period of 15 to 45 minutes, keeping the temperature below about 15° C. The contents in the two flasks were reacted for about the same periods of time so as to obtain low molecular weight polymers of I.V. about 0.1 to 0.2.

The above components (A) and (B) were run separately and simultaneously described and then combined, the tri-n-butylamine added and allowed to polymerize. After the polymerization had reached a satisfactory viscosity, the reaction mixture was acidified with glacial acetic acid, washed free of water-soluble materials, and the polymer precipitated from solution by pouring the viscous dope into several volumes of methyl alcohol.

The yield of white fibrous copolycarbonate was 90 percent of the theoretical value and it had an inherent viscosity of 0.7 in chloroform.

A clear film cast from a methylene chloride solution of this block copolycarbonate had the following physical properties:

Young's modulus _____ $2.65 \times 10^4$ kg./cm.$^2$.
Folds _____ 60.
Heat distortion temperature _____ 205° C.

Various runs were prepared as just described using other proportions of reactants and other reactants as covered by the above general Formula B. At the end of the separate runs the I.V. was usually about 0.1–0.2 although values of 0.05–0.25 are also contemplated. At the beginning of the combined polymerization reactions the polymer solutions had flow times of just a few seconds as measured from a standard pipette. After a few minutes of continuous stirring, the flow time of the combined reaction mixture had increased from 50 up to several hundred seconds depending upon the time mixed and the desired I.V. being sought. The polymerization was stopped at this time by acidifying the reaction with glacial acetic acid. The methylene chloride layer was diluted with enough methylene chloride to allow more efficient stirring and water washing of the polymer solution free of soluble materials. The polymer was usually precipitated from methylene chloride solution by slowly pouring the viscous dope into methyl alcohol. After leaching in fresh methanol, the polymer was generally dried at 50° C. under reduced pressure.

The yield of white fibrous polymer was usually at least 80% of the theoretical value. These block copolymers had an inherent viscosity of from about 0.4 to 3.5 as measured in chloroform. The I.V. can also be measured in other solvents such as in 1:1 phenol and chlorobenzene solution.

Physical properties of the block copolymers were in the ranges described above. See also the table below.

EXAMPLE D

*Block Copolycarbonate From Bisphenol A (40 Mole Percent) 4,4'-Bis(Hydroxyphenyl)Naphthyl Methane (60 Mole Percent)*

Using the procedure of Example C, the following materials were employed to prepare the prepolymers:

COMPONENT A

Bisphenol A _____ 11.4 g. (0.05 mole).
Sodium hydroxide _____ 5.6 g. (0.14 mole).
Phosgene in 50 ml. dry, cold, distilled methylene chloride _____ 5.4 g. (0.055 mole).
Distilled water _____ 120 ml.
Distilled methylene chloride _____ 100 ml.

COMPONENT B 4,4' - b i s (hydroxyphenyl)naphthyl methane _____ 24.45 g. (0.075 mole).
Sodium hydroxide _____ 8.4 g. (0.21 mole).
Phosgene in 50 ml. dry, cold, distilled methylene chloride _____ 8.2 g. (0.083 mole).
Distilled water _____ 200 ml.
Distilled methylene chloride _____ 120 ml.

COMPONENT C

Tri-n-butylamine _____ 1 ml.

The above components (A) and (B) were run separately and simultaneously, combined, the tri-n-butylamine added, and allowed to polymerize. After the polymerization had reached a satisfactory viscosity, the reaction mixture was acidified with glacial acetic acid, washed free of water-soluble materials, and the polymer precipitated from solution by pouring the viscous dope into several volumes of methyl alcohol.

The yield of white fibrous copolycarbonate was 97 percent of the theoretical value and it had an inherent viscosity of 0.42 in chloroform.

A clear 4 mil film cast from a methylene chloride solution of this block copolycarbonate had the following physical properties:

Young's modulus _____ 2.73×10⁴ kg./cm.².
Elongation _____ 6 percent.
Yield and tensile _____ 827 kg./cm.².
Tear _____ 103.
Folds _____ 52.
Heat distortion temperature ___ 216° C.

EXAMPLE E

*Block Copolycarbonate From Bisphenol A (40 Mole Percent) and 4,4'-Bis(Hydroxphenyl)-1-Chloro-2-Naphthyl Methane (60 Mole Percent)*

Using the procedure of Example C, the following materials were employed to prepare the prepolymers:

COMPONENT A

Bisphenol A _____ 11.4 g. (0.05 mole).
Sodium hydroxide _____ 5.6 g. (0.14 mole).
Phosgene in 50 ml. cold, dry, distilled methylene chloride _____ 5.4 g. (0.055 mole).
Distilled water _____ 120 ml.
Distilled methylene chloride ___ 100 ml.

COMPONENT B 4,4'-bis(hydroxyphenyl)-1-chloro-2-naphthylmethane _____ 26.9 g. (0.075 mole).
Sodium hydroxide _____ 8.4 g. (0.21 mole).
Phosgene in 50 ml. cold, dry, distilled methylene _____ 8.2 g. (0.83 mole).
Distilled water _____ 200 ml.
Distilled methylene chloride ___ 120 ml.

COMPONENT C

Tri-n-butylamine _____ ¼ ml.

The above components (A) and (B) were run separately and simultaneously, combined, the tri-n-butylamine added and allowed to polymerize. After the polymerization had reacted a satisfactory viscosity the reaction mixture was acidified with glacial acetic acid, washed free of water-soluble materials and the polymer precipitated from solution by pouring the viscous dope into several volumes of methyl alcohol.

The yield of white fibrous, copolycarbonate was 85 percent and it had an inherent viscosity of 0.65 in chloroform.

A clear film cast from a methylene chloride solution of this block copolycarbonate had the following physical properties:

Young's modulus _____ 2.85×10⁴ kg./cm.².
Folds _____ 45.
Heat distortion temperature ___ 205° C.

Other polymers and other block copolymers were prepared following the techniques described above using variations in the prescribed conditions and materials so as to obtain the data such as set forth in the following table. This data shows the value of various properties of solvent cast polycarbonate and comparative films approximately 0.005 inch thick. The values for the comparative films of cellulose triacetate and polystyrene are included in the table since their relationship to the improvement covered by this invention has been discussed hereinabove.

The preparation of film from these various polycarbonate polymers was generally accomplished using methylene chloride as the solvent in proportions such as 4 parts of solvent to 1 part of polymer or other suitable proportions to obtain a dope. The data was generally prepared by the machine coating technique employing a conventional coating machine having a dope hopper from which the dope is flowed onto a highly polished coating wheel from which it is stripped and cured as it passes through drying chambers. Of course, hand coating techniques can also be employed using apparatus wherein a coating knife with a vertically adjustable blade is used to manually spread the dope on a glass plate; the plate is put in an oven and dried for an extended period of time such as 18 hours at about 70° F. Although methylene chloride was generally employed, other solvents can also be used (e.g. other halogenated hydrocarbons) for the preparation of a solution or dope of the polymer so that it can be solvent cast or coated as described. Although the films tested in the table were not necessarily exactly 5 mils thick, the data set forth was adjusted accordingly so as to be properly comparable.

In this table the polycarbonates are considered as derived from bisphenols which are coded according to the following definition list:

| Bisphenol— | Code |
|---|---|
| 2,2-bis(4-hydroxyphenyl) propane | BPA |
| 2,2-bis(3,5-dichloro-4-hydroxyphenyl)propane | TCBPA |
| 4,4'-bis(hydroxyphenyl)naphthylmethane | NM |

The novel compounds contemplated by this invention have the following general formula:

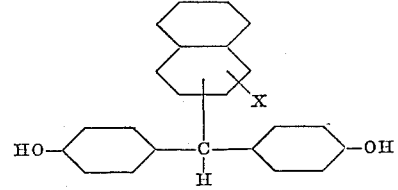

wherein the naphthyl radical is attached at a position selected from the 1 and 2 positions and X represents the substituent in the other one of the 1 and 2 positions and is selected from the group consisting of a chlorine atom, a fluorine atom and a hydrogen atom.

*Properties of Solvent Cast Polycarbonate and Other Comparative Films Approximately 0.005 inch Thick*

| | Mole Percent—See Definition List | | | Young's Modulus (10³ kg./cm.) | | Flexibility (MIT Folds) | | Heat Softening or Distortion Temperature (C.) | |
|---|---|---|---|---|---|---|---|---|---|
| | BPA | TCBPA | NM | Random | Block | Random | Block | Random | Block |
| (a) | 100 | | | 2.3 | | 148 | | 157 | |
| (b) | 80 | 20 | | 2.3 | | 62 | | 154 | |
| (c) | 75 | 25 | | | 2.5 | | 85 | | 165 |
| (d) | 70 | 30 | | 2.3 | | 47 | | 150 | |
| (e) | 40 | | 60 | | 2.7 | | 52 | | 216 |
| (f) | 30 | 70 | | 2.9 | | 10 | | 172 | |
| (g)[1] | 25 | 75 | | | ²3.0 | | ²70 | | 220–240 |
| (h)[2] | | 75 | 25 | | ²3.2 | | ²35 | | ²242 |
| (i) | 20 | 80 | | 2.9 | | 13 | | 200 | |
| (j) | | 100 | | 3.0 | | 16 | | 220–240 | |
| (k) | | | 100 | 2.73 | | 80 | | 215 | |
| Polystyrene (oriented) | | | | 3.5 | | 50 | | 100 | |
| Cellulose Triacetate | | | | 3.0–4.0 | | 25–35 | | 155 | |

[1] Covered by Laakso & Buckley, Ser. No. II.
[2] Covered by Laakso & Buckley, Ser. No. V.

According to a more particular embodiment of this invention there is provided a compound as covered by this general formula wherein X is hydrogen in the 1 position, which compound melts at about 188°–190° C.

The novel compounds of this invention can be prepared using the following general procedure: One mole of 1 or 2 naphthaldehyde which may be chlorinated or fluorinated as indicated above is dissolved in four moles of phenol. A trace of mercapto propionic acid is added and gaseous hydrogen chloride is bubbled into the reaction mixture at 20° to 60° C. until it is saturated. The reaction vessel is sealed and set aside at room temperature until the reaction is complete as evidenced by the reaction product crystallizing from solution. The reaction mixture is then steam distilled to remove most of the excess phenol and other volatiles. The residue is dissolved in diethyl ether and the ether solution is extracted with dilute sodium carbonate until the extracts are colorless. The produced bisphenol is extracted from the ether solution with dilute sodium hydroxide. The alkali solution is treated with decolorizing carbon and after filtration of the decolorizing carbon, the filtrate is carefully acidified with dilute hydrochloric acid. The crude bisphenol is filtered and crystallized from methylene chloride or other suitable solvent to obtain the pure product.

The film supports for photographic purposes contemplated by this invention can be coated with black and white or color types of photographic emulsions so as to form a photographic element having unusually valuable properties. The coating of film bases with photographic emulsions is well known in the art and is described in numerous patents and publications such as in a paper by Trivelli and Smith, The Photographic Journal, vol. 79, pages 330–338, 1939. Emulsions such as those described by Trivelli et al. can be readily coated upon the surface of the film base encompassed by this invention using standard coating techniques.

Photographic elements were prepared by coating such an emulsion as described by Trivelli and Smith upon the film base described in the preferred Examples.

In a container with temperature control was put a solution with the following composition:

(A) Potassium bromide _____ gm__ 165
    Potassium iodide _____ gm__ 5
    Gelatin _____ gm__ 65
    Water _____ cc__ 1700

And in another container was put a filtered solution consisting of:

(B) Silver nitrate _____ gm__ 200
    Water _____ cc__ 2000

Solution A was kept at a temperature of 70° C. during precipitation and ripening, while solution B was put in a separating funnel at a temperature of 72° C. The silver nitrate solution ran from the separating funnel through a calibrated nozzle into the container, the contents of which were kept in constant motion during precipitation and ripening, and, later, during finishing, by a mechanical stirrer.

After the precipitation, the emulsions were ripened for 20 minutes at the temperature of precipitation (70° C.). Then, they were cooled as quickly as possible to 45° C., and at this temperature 250 gm. of washed gelatin were added to each emulsion. The emulsions were stirred for 20 minutes at 45° C. in order to dissolve this gelatin. After standing overnight in a cold storage room, the emulsions were shredded and washed. They were then melted in the container at a temperature of 42° C. The weight of each of the emulsions was brought to 6.3 kg. (14 lbs.) by adding 100 gm. of gelatin soaked in the required amount of distilled water. Finishing was accomplished in 30 minutes, at a temperature of 60° C.

The photographic elements prepared as described were exposed to light and tested to determine their characteristics and found to behave satisfactorily in all regards and to have exceptionally advantageous properties at temperatures in excess of 150° C. a quite satisfactorily high degree of flexibility, and a Young's modulus of elasticity adequate for normal photographic purposes, especially when a suitable pelloid was applied to the back of the support. If desired the silver halide emulsion can be coated upon a subbing which is first applied to the film support and may be composed of a suitable gelatin composition or a terpolymer latex as described in the prior art, e.g. a latex of an acrylic ester, a vinyl or vinylidene halide and an unsaturated acid such as acrylic acid or itaconic acid, of U.S. 2,570,478. See also British Patent 808,629.

In the data presented herein the flexibility test was performed and the values recorded as to well cured film having a minimal retention of solvent since solvent retention in recently made film may give unrealistic values as to flexibility. The MIT folds test was performed using an MIT folding endurance tester made by Tinius Olsen; the technique employed is that originally designed some years ago for testing the flexibility of paper and now generally recognized as applicable to sheets of synthetic resins, viz. ASTM method D 643-43.

The block copolyesters as described are also useful as sheet packaging materials, adhesive tape bases, kinescope recording tape, dielectrics for condensers, etc. They have high melting points and are tough, elastic, tear resistant, resilient and are endowed with good electrical properties under various conditions including moist humid air in the tropics, air frictional heat in the nose cones of rockets or missiles, carbon arc motion picture projection, etc.

Although the invention has been described in considerable detail with reference to certain preferred embodiments thereof, it will be understood that variations and modifications can be effected without departing from the spirit and scope of the invention as described hereinabove and as defined in the appended claims.

As mentioned above other applications by Laakso et al. cover:

(1) Block copolycarbonates of bisphenol A and 4,4'-bis(hydroxyphenyl) - monohalophenyl methanes and homopolymers of the latter bisphenol, Ser. No. 827,695, filed July 17, 1959.

(2) Block copolycarbonates of bisphenol A and 4,4'-bis(hydroxyphenyl)-methyldihalophenyl methanes, Ser. No. 827,694, filed July 17, 1959.

We claim:

1. An improved polycarbonate of 2,2-bis(4-hydroxyphenyl)propane consisting of a highly polymeric block copolymer having an inherent viscosity of from about 0.4 to about 3.5 essentially composed of alternating blocks having the structures:

(I) Blocks characterized in that these blocks as an independent polymer would have an inherent viscosity of at least 0.05 measured in chloroform and be composed of from about 3 to about 50 recurring units having the following Formula A:

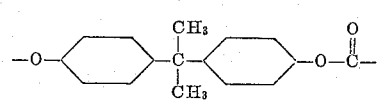

and (II) Blocks characterized in that these blocks as an independent polymer would have an inherent viscosity of at least 0.05 measured in chloroform and be composed of about 3 to about 50 recurring units having the following Formula B:

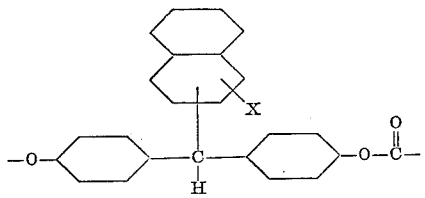

wherein the naphthyl radical is attached in a position selected from the 1 and 2 positions and X represents the substituent in the other one of the 1 and 2 positions and is selected from the group consisting of a chlorine atom, a fluorine atom and a hydrogen atom and wherein from about 15 to 65 mole percent of said block copolymer is composed of said units having Formula A, said block copolymer being characterized by having a heat distortion temperature in the range of from about 190°–225° C., having a Young's modulus of elasticity for film which is substantially as great as for the homopolymer of units of Formula A and at least about 26,000 kg./sq. cm. which is greater than for the homopolymer of units of Formula A, and having a flexibility measured by the MIT folds test at least about 35.

2. An improved film of a polycarbonate as defined by claim 1 wherein about 60 mole percent of said block copolymer is composed of said units having Formula B wherein X is hydrogen in the 1-position and the naphthyl radical is attached in the 2-position, said block copolymer being particularly characterized by having a heat distortion temperature of about 216° C., and having a Young's modulus of elasticity of about 27,000 kg./sq. cm.

3. A linear polymer having an inherent viscosity of from about 0.4 to about 3.5 comprising a polycarbonate of a bisphenol having the following general formula:

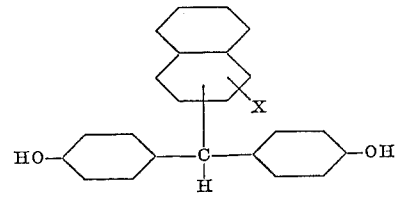

wherein the naphthyl radical is attached at a position selected from the 1 and 2 positions and X represents the substituent in the other one of the 1 and 2 positions and is selected from the group consisting of a chlorine atom, a fluorine atom and a hydrogen atom.

4. A polymer as defined by claim 3 wherein X is chlorine attached in the 1 position.

5. A polymer as defined by claim 3 wherein X is a hydrogen atom in the 1 position.

References Cited in the file of this patent
UNITED STATES PATENTS

| | | |
|---|---|---|
| 1,971,436 | Weiler | Aug. 28, 1934 |
| 2,669,588 | Deming et al. | Feb. 16, 1954 |
| 2,698,241 | Sauer | Dec. 28, 1954 |
| 2,799,666 | Caldwell | July 16, 1957 |
| 2,843,567 | Williams et al. | July 15, 1958 |
| 2,874,046 | Klockgether et al. | Feb. 17, 1959 |
| 2,970,131 | Moyer | Jan. 31, 1961 |

OTHER REFERENCES

Schnell: Ind. Eng. Chem., 51, 157–160 (February 1959).